United States Patent [19]
Zeller et al.

[11] Patent Number: 6,129,943
[45] Date of Patent: Oct. 10, 2000

[54] FOAMING CAPPUCCINO CREAMER CONTAINING GASIFIED CARBOHYDRATE

[75] Inventors: Bary Lyn Zeller, Glenview, Ill.; Thomas Richard Kiessling, New York, N.Y.

[73] Assignee: Kraft Foods, Inc., Northfield, Ill.

[21] Appl. No.: 09/338,483

[22] Filed: Jun. 22, 1999

[51] Int. Cl.$^7$ ............................ A23C 11/02; A23C 23/00
[52] U.S. Cl. .................... 426/564; 426/569; 426/570; 426/588; 426/596
[58] Field of Search ...................... 426/588, 596, 426/564, 569, 570

[56] References Cited

U.S. PATENT DOCUMENTS

| | | | |
|---|---|---|---|
| 4,438,147 | 3/1984 | Hedrick, Jr. | 426/570 |
| 4,746,527 | 5/1988 | Kuypers | 426/569 |
| 4,748,040 | 5/1988 | Kuypers | 426/569 |
| 4,868,000 | 9/1989 | Tandy | 426/564 |
| 5,284,674 | 2/1994 | Fazio | 426/580 |
| 5,462,759 | 10/1995 | Westerbeek et al. | 426/568 |
| 5,721,003 | 2/1998 | Zeller | 426/569 |
| 5,780,092 | 7/1998 | Agbo | 426/569 |
| 5,882,716 | 3/1999 | Munz-Schaerer | 426/591 |
| 5,894,031 | 4/1999 | Caly | 426/564 |
| 5,928,703 | 7/1999 | Chmiel | 426/580 |
| 6,048,567 | 4/2000 | Villagran | 426/564 |

FOREIGN PATENT DOCUMENTS

| | | |
|---|---|---|
| 1291661 | 8/1986 | Canada . |
| 0579328 | 1/1994 | Netherlands . |

*Primary Examiner*—Carolyn Paden
*Attorney, Agent, or Firm*—Thomas A. Marcoux; Thomas R. Savoie

[57] ABSTRACT

A particulate, dry-mix foaming creamer composition comprising a particulate protein component in an amount of from 1 to 30%, a foam-generating amount of a particulate, gasified carbohydrate, preferably from 20 to 90%, said carbohydrate having a bulk density of less than 0.3 g/cc and a lipid in an amount of from 0 to 30%, all amounts based upon the weight of the composition. The creamer can be added to brewed coffee to produce a cappuccino-type whitened coffee with a surface layer of foam or it can be added to instant coffee and optionally a sweetener to produce a particulate, dry-mix instant cappuccino product.

21 Claims, No Drawings

FOAMING CAPPUCCINO CREAMER CONTAINING GASIFIED CARBOHYDRATE

BACKGROUND OF THE INVENTION

Dry-mix instant cappuccino beverages have been traditionally formulated using one of two available techniques to produce a head of foam upon reconstitution in water. The most practiced method is to formulate a complex spray-dried gasified creamer powder containing a protein source, typically non-fat milk (NFDM), a fat source, typically a partially hydrogenated vegetable oil, and a carrier, typically a carbohydrate. Protein-rich ingredients such as milk powders are used to trap gas bubbles injected in the creamer during spray-drying. The resulting low-density foaming creamer releases its encapsulated gas to produce a foam when reconstituted in water. A less practiced method is to dry blend chemical carbonation reagents with a non-gasified high-density creamer, usually formulated with the same ingredients used in the low-density creamers. The creamer traps the carbon dioxide gas released from the chemical carbonation reagents during reconstitution in water to produce foam. The effectiveness of foaming can be improved for either method by adding film-forming ingredients such as starch, gum, or additional protein to the finished dry-mix cappuccino composition.

Foaming creamers produced by gas injection are difficult to produce and test and those which contain milk proteins often develop processed or cooked flavors during their production. Use of chemical carbonation reagents, typically a combination of a food acidulant and an alkaline bicarbonate salt, to generate foam can impart a salty or bitter flavor to the cappuccino beverage, the volume of foam obtained is greatly dependent on beverage temperature, the amounts of these additives must be carefully controlled and products containing them typically must be packaged as single servings to ensure effective foam generation, acid-alkali neutralization, and beverage pH. Additionally, their use can increase cost and create an undesirable package ingredient line for some products, and products formulated with these reagents are difficult to rework if production errors occur.

There is a need for particulate dry-mix foaming creamers that can be made simply. There is also a need for such creamers which when formulated with milk protein, do not develop processed or cooked flavors during the production. There is still a further need to avoid the problems associated with the use of chemical carbonation reagents such as the considerable variability in the volume of foam generated over the wide range of beverage temperatures used to prepare cappuccino beverages, potential adverse effects on flavor quality, and the need for precise weight controls during manufacture.

BRIEF SUMMARY OF THE INVENTION

In accordance with the invention, there is provided a particulate dry-mix foaming creamer composition which comprises a particulate protein component, optionally a lipid component, and a foam-generating amount of a particulate, gasified, low density carbohydrate having a bulk density of less than 0.3 g/cc, and a particulate, dry-mix instant cappuccino composition which includes the foaming creamer composition and a water soluble coffee.

Traditional gasified creamers are produced by sequentially dispersing all components (protein source, lipid source, emulsifiers, buffers, and carbohydrate spray-drying carrier) in water using a specific order of addition, mixing the components to produce a uniform slurry, heating the slurry to provide microbiological stability, homogenizing the slurry to form an oil-in-water emulsion having a specific oil droplet size distribution, and then gasifying the slurry prior to spray-drying. In contrast, the present invention provides the advantage of gasifying only the carbohydrate to obtain a low density carbohydrate which is dry blended with protein and the other creamer ingredients to obtain a foaming creamer. Typically, the low density carbohydrate can be manufactured by dissolving only a single component (carbohydrate spray-drying carrier) in water to form a simple solution, or utilizing an existing carbohydrate solution taken from a manufacturing process stream, gasifying the solution prior to spray-drying, and dry-mixing the low density carbohydrate with other powdered ingredients to form a foaming creamer.

In addition to simpler processing, the invention provides the following other advantages over traditional gasified creamers: the carbohydrate compound is more easily dried, lower in cost, and more neutral in flavor and appearance than the other components used to formulate the dry-mix; drying only the carbohydrate allows faster production and greater control over gas injection and finished product characteristics; any out-of-specification dried product which may be produced can be easily reconstituted in water and dried again without the need to check an emulsion size and stability and without subjecting a protein source to a second heat treatment. Furthermore, there exists greater flexibility to easily create a wide variety of foaming mixtures which produce optimal beverage whitening and foam volume, texture, and appearance for different product application; and mixtures of the present invention prepared without a lipid source can be used to generate foam upon addition to cold water or milk, unlike traditional foaming creamers which typically contain encapsulated hydrogenated oils and do not dissolve in cold beverages.

DESCRIPTION OF PREFERRED EMBODIMENTS

The protein of the particulate protein component of the creamer may be a dairy or non-dairy protein. Suitable dairy-derived proteins include non-fat dry milk (NFDM), sodium caseinate, whey protein concentrate (WPC) or isolate (WPI) and milk protein concentrate (MPC) or isolate (MPI). Suitable non-dairy proteins include those derived from grains such as rice or wheat, or from legumes, such as soybean and pea. Combinations of proteins of various types may also be employed.

At least part of the protein content of the foaming creamer composition may be provided as a particulate, spray-dried, creamer which encapsulates at least a portion of the lipid component of the composition. Such fat-encapsulating spray-dried creamers typically include 3–30% protein, 5–50% lipid, and 20 to 90% carrier, typically a carbohydrate. Spray-dried creamers of this type, when employed in the present creamer composition, preferably are high density, non-gasified creamers. Such high density creamers have a bulk density of at least about 0.30 g/cc and typically within the range of 0.40–0.60 g/cc, whereas low density (i.e., gas-injected) spray-dried creamers of this type have a bulk density of less than 0.30 g/cc and typically within the range of 0.10 to 0.20 g/cc. These percentages, and all percentages in the present specification and claims, are percentages by weight of solids and based on the weight of the solids of the composition in question unless otherwise stated. Additional particulate protein may be included in the present dry-mix creamer composition to achieve a desired total protein content. Alternatively, the entire protein content of the composition may be present in the fat-encapsulating spray-dried creamer. In either event, the total protein content of the creamer composition is suitably 1 to 30%, preferably 5 to 25%, and more preferably 10 to 20%.

The lipid component of the foaming creamer composition may be one or more dairy or non-dairy fats, preferably having a melting point in the range of 100° F. to 140° F. Suitable non-dairy fats include partially hydrogenated vegetable oil having a melting point of about 100° to 120° F. Preferred non-dairy lipids include partially hydrogenated soybean oil, coconut oil, and palm kernel oil. In addition, oils that are liquid at room temperature can also be utilized.

Total lipid content of the creamer composition, including any lipid that is present as such or which may be present with another component of the creamer composition such as by encapsulation in spray-dried creamer powder, is suitably 0 to 30%, preferably 5 to 20%, and more preferably 10 to 15%.

Spray-dried creamers also generally include one or more carriers such as spray-drying carriers, fillers, or bulking agents. Suitable carriers include gum arabic and water soluble carbohydrates, such as maltodextrin, lactose, corn syrup solids, and sugars. The total amount of carrier in the spray-dried creamer particles is generally widely variable and suitably about 20 to 90%.

The particulate gasified carbohydrate component of the creamer composition has a bulk density suitably in the range of 0.04 to 0.3 g/cc, preferably 0.06 to 0.2 g/cc, and more preferably 0.08 to 0.15 g/cc. "Bulk density" as used herein in connection with the gasified carbohydrate and other particulate components of the present compositions, means bulk density determined by measuring the volume, in cubic centimeters (cc), that a given weight, in grams (g), of material occupies when poured through a funnel into a stationary graduated cylinder.

The amount of the particulate low density carbohydrate component in the creamer, as well as its density, can be selected to deliver a wide range of foam volume. The lower the density of the carbohydrate, the less which is needed to produce a given amount of foam, but the more fragile and susceptible it is to breakage and the more difficult and costly it is to manufacture and transport. The content of low density carbohydrate particles in the foaming creamer composition is suitably 20 to 90%, preferably 40 to 80%, and more preferably 50 to 70%.

The gasified particulate carbohydrate component is preferably produced by gas injection during spray-drying of common food ingredients such as, but not limited to, maltodextrins preferably from corn, oligodextrins preferably from rice, sugars such as sucrose, maltose, and lactose, gums such as gum arabic, xanthan, and carrageenan, and sugar alcohols, such as maltitol, xylitol and lactitol. Preferably, the gasified particulate carbohydrate component is spray-dried maltodextrin.

The foaming creamer composition may be added directly to a coffee beverage, preferably hot brewed coffee, to form a whitened coffee beverage with cappuccino-type foam. The amount of creamer composition used will depend on the amount of whitening and foam desired by the consumer. In general, it is preferred that about one to four rounded tablespoonfuls of creamer, or about 5 to 20 grams, is required to produce a cappuccino type beverage by addition of the creamer to an eight ounce serving of black coffee. The coffee may be decaffeinated or non-decaffeinated, and the beverage may be sweetened to taste.

The creamer composition may also be combined with water soluble coffee solids to provide a particulate, dry-mix instant cappuccino composition.

The coffee component in the dry-mix instant cappuccino composition is preferably conventional spray-dried instant coffee, but any type of powdered or granular water soluble coffee solids may be employed. Gasified spray-dried instant coffee may also be used to provide additional foaming capability. The cappuccino composition or the creamer composition may also include chocolate, vanilla or other flavor ingredients which are intended to modify the coffee flavor of the cappuccino beverage.

The amount of the foaming creamer component in the dry-mix instant cappuccino composition may vary considerably. In general, the creamer content of the cappuccino composition will be from 100 to 1500%, preferably from 300 to 1200%, and more preferably from 500 to 1000%, based on the weight of the coffee component of the cappuccino composition.

A sweetener component is optional in the instant cappuccino composition. If present, a sweetener is present in an amount sufficient to provide sweetness appropriate for a cappuccino beverage. Natural sugar sweeteners such as granulated sucrose are preferred. Other sugars may, however, be employed either alone or in combination with sucrose. An artificial sweetener may also be employed in an amount which depends on its sucrose equivalence, provided that it will be effective in a hot or cold cappuccino beverage.

Where sucrose is employed as the sole sweetener in the cappuccino composition, an amount of from 1 to 20 parts by weight, per part by weight of the coffee component, is suitable and an amount of 1 to 8 parts per weight per part by weight of the coffee component is preferred. Where a different sweetener is utilized either alone or in combination with sucrose, it is preferably employed in an amount such that the sweetness of the sweetener component is equivalent to the amount of sucrose mentioned above. Thus, it is preferred that a beverage prepared from a sweetened cappuccino composition in accordance with the invention has a sweetness within the range of sweetness that would result from the use in the composition of sucrose alone in the amount mentioned above.

The composition may also include other components normally employed in instant cappuccino compositions such as flavoring, coloring, silicon dioxide, buffers such as trisodium citrate and disodium phosphate, and the like.

The particle size of the low density carbohydrate is suitably 50 to 5000 microns, preferably 200 to 4000 microns, and more preferably 500 to 3000 microns.

The following examples are provided for the purpose of illustration and are not intended to limit the scope of the present invention. Table 1 sets forth the percentage of low density carbohydrate, percentage protein and percentage lipid in the foaming creamer on a by weight percentage basis.

Comparison Example A

A hot cappuccino beverage is prepared by reconstituting a commercial instant cappuccino powder in eight ounces of 190° F. water in a 400 mL beaker having a diameter of three inches. One sixteenth of an inch of height in the beaker corresponds to 7 mL of beaker volume. The cappuccino powder contains 10.5 grams of a spray-dried gasified fat-encapsulated low density (0.15 g/cc) creamer formulated with non-fat dry milk and having approximately 20% by weight fat content, (partially hydrogenated soybean oil) and approximately 20% protein spray-dried using lactose as a carrier. To the creamer was added 10 grams of a particulate coffee-flavored sweetener pre-mix containing 8.0 grams of sucrose and 1.5 grams of instant coffee and minor amounts of flavor and buffer. After reconstitution, foam height above the beverage in the beaker initially is 7/16" and after five minutes is 6/16".

EXAMPLE 1

A particulate dry-mix foaming creamer composition is prepared by dry blending 7.0 grams of agglomerated low density (0.08 g/cc) gasified 10 DE maltodextrin (Star-Dri® 1005; A. E. Staley Manufacturing Company) with 1.5 grams of whey protein isolate (WPI) powder (New Zealand Milk Products, Alacen 895) and 2.0 grams of spray-dried, high density (0.5 g/cc) non-dairy creamer powder having a fat content of 48% by weight, a protein content of 5% by weight and spray-dried using corn syrup solids as the carrier. The foaming creamer composition is then dry blended with 10 grams of the sweetened coffee-flavored pre-mix described in Comparison Example A to form an instant, particulate, dry-mix foaming cappuccino composition. The cappuccino composition is then reconstituted in eight ounces of 190° F. water in the 400 mL beaker described in Comparison Example A. Foam height initially is 7/16" and after five minutes is 7/16". The appearance of the foam is essentially identical to the foam of Comparison Example A. The beverage has a slightly lighter color with less creamy flavor and less sweetness than the beverage of Comparison Example A.

EXAMPLE 2

An instant cappuccino composition is prepared in the same manner as Example 1, except that the amount of non-dairy creamer added to the foaming creamer composition is increased to 3 grams and the amount of sucrose present in the coffee flavored sweetener pre-mix is increased to approximately 13 grams. The foam height, creaminess and sweetness of the reconstituted beverage closely match the reconstituted beverage of Comparison Example A.

Comparison Example B

The procedure of Example 1 is followed except that the whey protein isolate is omitted from the foaming creamer composition, leaving only the small amount of protein present in the high density creamer component of the foaming creamer composition to stabilize the foam generated by the low density carbohydrate. Foam height is initially 6/16" and after five minutes is 4/16". Because of the low protein content of the foaming creamer composition, the foam is noticeably watery and fragile and is essentially devoid of the desirable opacity and creamy texture that characterizes the foam of Comparison Example A and of Examples 1 and 2.

EXAMPLE 3

A foaming creamer composition is prepared in the same manner as Example 1 except that the whey protein isolate component (1.5 grams) and high density spray-dried creamer component (2.0 grams) of the foaming creamer composition are replaced by 3.5 grams of a high density spray-dried creamer containing 15% of a partially (66%) denatured whey protein concentrate (WPC) and 30% encapsulated partially hydrogenated soybean oil spray-dried using corn syrup solids as the carrier. The high density spray-dried creamer has a density of about 0.4 g/cc and is prepared by heating a homogenized aqueous slurry of its components, prior to spray-drying, to effect partial denaturation. After reconstituting of a cappuccino beverage as described in Example 1, foam height is initially 6/16" and after five minutes is 5/16". The foam is slightly more creamy in appearance than the foam of the reconstituted cappuccino beverage of Comparison Example A. The composition contains one-half of the fat content of the composition of Comparison Example A and the reconstituted beverage is much less white than that of Comparison Example A. Addition of 2.0 grams of the high density non-dairy creamer of Example 1 to the foaming creamer formulation increases fat content to that of Comparison Example A, and whiteness of a cappuccino beverage is then comparable to that of the cappuccino beverage of Comparison Example A.

EXAMPLE 4

Example 1 is followed except that the whey protein isolate component (1.5 grams) and high density spray-dried creamer components (2.0 grams) are replaced by 3.5 grams of non-fat dry milk, resulting in a fat-free (0.3%) foaming creamer composition. A continuous head of foam is obtained in the reconstituted fat-free cappuccino beverage. Foam height initially is 6/16" and after five minutes is 5/16". The reconstituted cappuccino beverage is less white due to the absence of fat. Addition of 2.0 grams of the high density non-dairy creamer of Example 1 (48% fat content) provides excellent whitening and flavor without adversely affecting foaming properties.

EXAMPLE 5

A foaming creamer composition is formulated as in Example 1 except that the whey protein isolate component (1.5 grams) is replaced with 1.5 grams of milk protein concentrate (New Zealand Milk Products Alapro 4850). The creamer composition is then dry blended with 3.0 grams of an artificially sweetened coffee-flavored pre-mix containing 1.5 grams of instant coffee, bulking agent, and a small amount of aspartame and vanilla flavor. A continuous head of foam is obtained in a cappuccino beverage reconstituted as in Example 1. Foam height is initially 7/16" and after five minutes is 6/16". The foam is similar in appearance to the foam obtained by reconstituting a commercial, artificially sweetened cappuccino product (Maxwell House Cafe™ Sugar Free Cappuccino™), with minor differences in beverage appearance and flavor. Initial foam height of the reconstituted commercial product is 9/16" and after five minutes is 6/16". The color of the cappuccino beverage of this example is slightly darker than that of the commercial product. Addition of 1.0 grams of the non-dairy creamer of Example 1 to the formulation results in beverage whiteness comparable to that of the commercial product without adversely affecting foaming properties.

EXAMPLE 6

Example 1 is followed, except that the maltodextrin component (density 0.08 g/cc) is replaced with the same amount (7.0 grams) of agglomerated, low density, gasified 10 DE maltodextrin (Maltrin M700; Grain Processing Corporation) having a density of 0.13 g/cc. After reconstitution with hot water in the same manner as in Example 1, foam height is initially 7/16" and after five minutes is 6/16". The appearance of the foam is identical to that of the cappuccino beverage of the commercial product of Comparison Example A.

EXAMPLE 7

This example demonstrates the ability to produce a foaming cappuccino beverage from brewed coffee using a foaming creamer composition in accordance with the invention.

A foaming creamer composition prepared as described in Example 1 is reconstituted in eight ounces of hot brewed coffee in a 400 mL beaker as described in Example 1. Foam height is initially 9/16" and after five minutes is 5/16".

After reconstitution, the beverage has a whitened appearance and a layer of foam possessing a creamy texture.

EXAMPLE 8

This example demonstrates the ability to produce a foaming cappuccino beverage with milk using a particulate gasified carbohydrate in accordance with the invention.

A creamer composition is prepared as in Example 1 by combining 7 grams of the gasified, low density (0.08 g/cc) 10 DE maltodextrin, and 3 grams of the high density, non-dairy coffee creamer powder of Example 1. The creamer composition is dry blended with 17 grams General Foods International Coffee® Cappuccino Coolers Sweetened Instant Iced Cappuccino.

Upon reconstitution in cold skim milk (approximately 40° F.) foam height above the cappuccino beverage is initially 9/16" and is 6/16" after five minutes.

EXAMPLE 9

A particulate dry-mix foaming creamer composition is prepared by dry blending 6.0 grams of 10 DE low density gasified (0.13 g/cc) maltodextrin with 3.5 grams NFDM and 2.0 grams of the 48% fat content non-dairy whitener of Example 1. To the foaming creamer composition is added 2.0 grams of low-density (0.16 g/cc) gasified instant coffee and 10 grams of sucrose to produce an instant dry-mix cappuccino product.

Reconstitution in hot water as in Example 1, produces a cappuccino beverage having a mild coffee flavor and a continuous head of foam. The presence of gasified instant coffee in the mix adds to the foam height obtained.

TABLE 1

FOAMING CREAMER COMPOSITION

| Example | % Low Density Carb | % Protein | % Lipid |
| --- | --- | --- | --- |
| COMPARISON EX. A | — | 20.0 | 20.0 |
| 1 | 66.7 | 14.4 | 9.1 |
| 2 | 60.9 | 13.6 | 12.5 |
| COMPARISON EX. B | 77.8 | 1.1 | 10.7 |
| 3 | 66.7 | 5.0 | 10.0 |
| Plus Additional Creamer | 56.0 | 5.0 | 16.1 |
| 4 | 66.7 | 12.0 | 0.3 |
| Plus Additional Creamer | 56.0 | 10.9 | 8.0 |
| 5 | 66.7 | 12.7 | 9.4 |
| Plus Additional Creamer | 60.9 | 12.0 | 12.8 |
| 6 | 66.7 | 14.4 | 9.1 |
| 7 | 66.7 | 14.4 | 9.1 |
| 8 | 70.0 | 1.5 | 14.4 |
| 9 | 52.2 | 11.8 | 8.7 |

What is claimed is:

1. A particulate, dry-mix foaming creamer composition comprising a particulate protein component in an amount of from 1 to 30%, a foam-generating amount of a particulate, gasified carbohydrate having a bulk density of less than 0.3 g/cc and a lipid in an amount of from 0 to 30%, all amounts based upon the weight of the composition.

2. A creamer composition according to claim 1 wherein said particulate carbohydrate is present in an amount of from 20 to 90% by weight based on the weight of the composition.

3. A creamer composition according to claim 2 wherein said particulate carbohydrate has a bulk density from 0.04 to 0.3 g/cc.

4. A particulate, dry-mix foaming creamer composition according to claim 1, having a protein content of from 5% to 25%, a particulate, gasified carbohydrate in an amount of from 40 to 80% and lipid in an amount of 5 to 20%.

5. A particulate, dry-mix foaming creamer composition according to claim 4, having a protein content of from 10 to 20%, a lipid content from 10% to 15% by weight and a particulate, gasified carbohydrate in an amount of from 50 to 70%.

6. A particulate, dry-mix foaming creamer composition according to claim 1, wherein said carbohydrate is selected from the group consisting of maltodextrins, oligodextrins, sugars, gums, and sugar alcohols.

7. A creamer composition according to claim 6 wherein the carbohydrate is corn maltodextrin.

8. A creamer composition according to claim 1, wherein said particulate, gasified carbohydrate has a bulk density of from 0.06 to 0.2 g/cc.

9. A particulate, dry-mix foaming creamer composition according to claim 8, wherein said particulate, gasified carbohydrate has a bulk density of from 0.08 to 0.15 g/cc.

10. A particulate, dry-mix foaming creamer composition according to claim 1, wherein said particulate protein component comprises lipid-encapsulated protein particles.

11. A particulate, dry-mix instant cappuccino composition comprising a particulate dry-mix foaming creamer composition according to claim 1, and a particulate water soluble coffee component.

12. A particulate, dry-mix instant cappuccino composition according to claim 11 wherein the particulate water soluble coffee component is a gasified spray-dried coffee which provides additional foaming capability.

13. A particulate, dry-mix instant cappuccino composition according to claim 11 further comprising a sweetener component.

14. A method for producing a dry-mix foaming creamer composition comprising:
admixing a particulate protein component in an amount of from 1 to 30% with a foam-generating amount of a particulate, gasified carbohydrate having a bulk density of from 0.04 to 0.3 g/cc and a lipid in an amount of from 0 to 30% all amounts based upon the weight of the composition.

15. The method of claim 14 wherein the protein component is from 5 to 25%, the lipid is from 5 to 20% and the amount of foam-generating, gasified carbohydrate is from 20 to 90%.

16. The method of claim 15 wherein the amount of gasified carbohydrate is from 40 to 80% and the bulk density is from 0.06 to 0.2 g/cc.

17. The method of claim 16 wherein the protein content is from 10 to 20%, the lipid is from 10 to 15% and gasified carbohydrate is from 50 to 70%.

18. The method of claim 14 wherein the carbohydrate is selected from the group consisting of maltodextrins, oligodextrins, sugars, gums and sugar alcohols.

19. The method of claim 18 wherein the carbohydrate is corn maltodextrin having a bulk density of from 0.08 to 0.15 g/cc.

20. The method of claim 14 additionally comprising adding a particulate water soluble coffee component to the dry-mix foaming creamer to produce a dry-mix instant cappuccino product.

21. The method of claim 20 wherein the particulate water soluble coffee component is a gasified, spray-dried coffee which provides additional foaming capability.

* * * * *